United States Patent [19]

Morris et al.

[11] Patent Number: 4,555,614
[45] Date of Patent: Nov. 26, 1985

[54] WELD METAL COOLING RATE INDICATOR SYSTEM

[75] Inventors: Richard A. Morris, Severna Park; William E. Lukens, Annapolis; Charles A. Zanis, Bowie, all of Md.

[73] Assignee: The United States of America as represented by the Secretary of the Navy, Washington, D.C.

[21] Appl. No.: 685,943

[22] Filed: Dec. 24, 1984

[51] Int. Cl.⁴ .............................................. B23K 9/10
[52] U.S. Cl. ................................. 219/130.01; 219/147
[58] Field of Search ..................... 219/130.01, 130.21, 219/147

[56] References Cited

U.S. PATENT DOCUMENTS

| | | | |
|---|---|---|---|
| 2,045,800 | 6/1936 | Richter | 219/130.01 |
| 3,302,277 | 2/1967 | Pruden et al. | 29/407 |
| 3,370,151 | 2/1968 | Normando | 219/130.01 |
| 3,400,266 | 9/1968 | Yoder et al. | 250/83.3 |
| 4,375,026 | 2/1983 | Kearney | 219/130.01 |
| 4,399,346 | 8/1983 | Kearney | 219/130.01 |

Primary Examiner—Clifford C. Shaw
Attorney, Agent, or Firm—R. F. Beers; Ervin F. Johnston

[57] ABSTRACT

A weld metal cooling rate indication system is provided for a welding machine. The welding machine has a torch which is capable of producing a weld bead and has a speed sensor which senses the speed at which the torch travels as selected by an operator. The indication system includes a device for continuously sensing a profile of temperatures along the weld bead, this profile including a predetermined weld temperature. Another device receives the temperature profile and travel speed of the torch information for calculating and producing a signal which represents rate of change of weld temperature at the predetermined weld temperature. A range of acceptable rates of change of weld temperatures at the predetermined weld temperature is provided so that the rate of change of weld temperature at the predetermined weld temperature can be compared with this range. A device is then provided which is responsive to the comparing information for indicating whether the rate of change of weld temperature is within, above, or below the range of acceptable rates of change of weld temperatures. With this arrangement the welding operator can adjust the speed of the welding torch so that a proper rate of change of weld temperature is maintained at all times to increase the quality of the weld.

8 Claims, 2 Drawing Figures

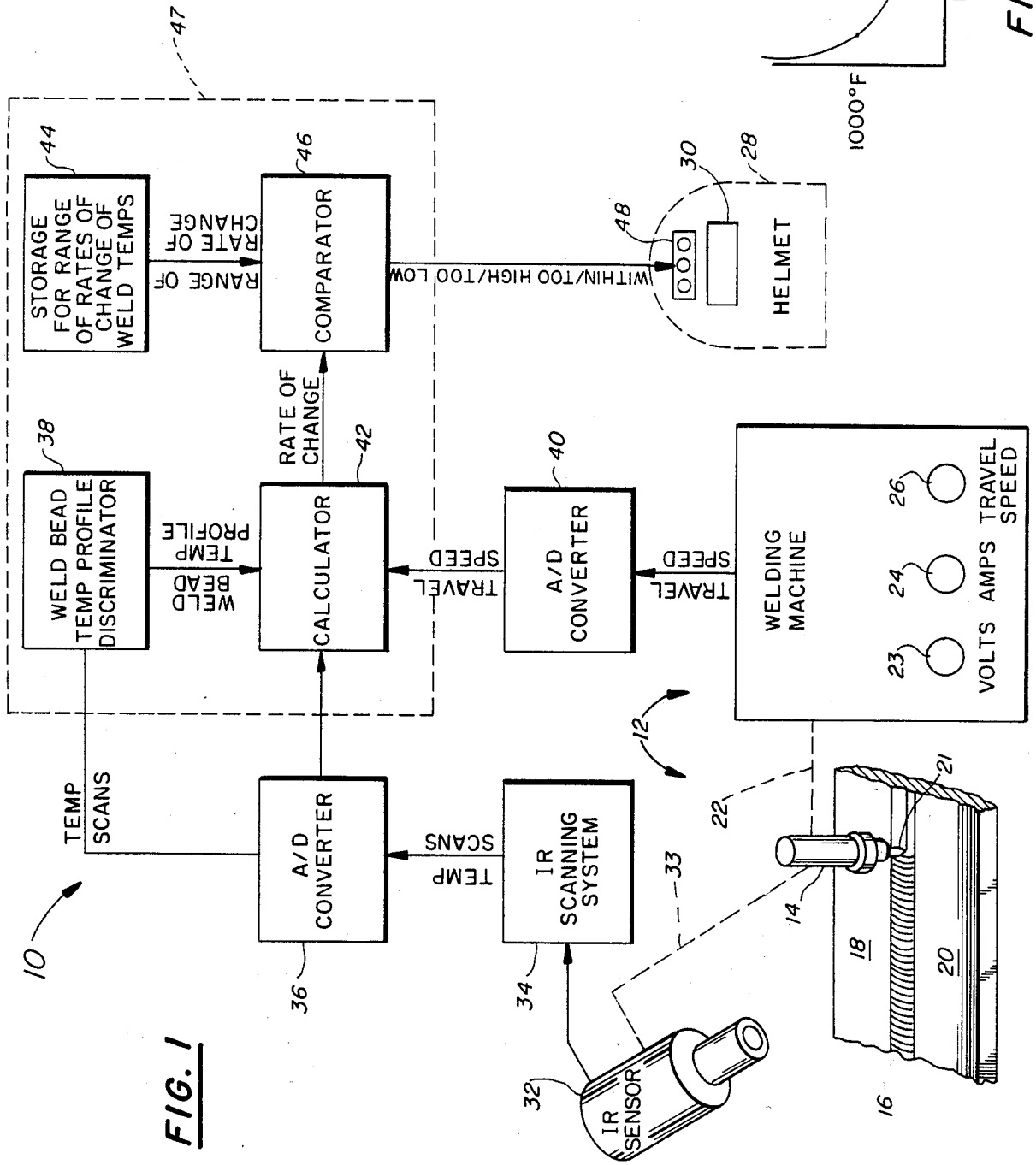

WELD METAL COOLING RATE INDICATOR SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to a system for indicating the cooling rate of a weld bead so that an operator can adjust a welding machine to insure that the cooling rate is within an acceptable range for obtaining a high strength and tough weld.

It is well known that when metal is cooled quickly, such as by quenching, desired mechanical properties may be obtained. Many metals are purposely cooled at a predetermined cooling rate so that they have a desired strength and toughness. While in many applications this is easy to achieve, it becomes somewhat difficult in welding operations. This is because a welding operation is a dynamic adventure where the cooling rate depends upon many variables including the travel speed of the torch, the voltage and amperage outputs of the welding machine and the preheat of the plate. If the torch is moved faster, while the voltage and amperage are kept constant, the cooling rate will rise, and if the torch is moved slower the cooling rate will drop. For any weld bead there is a desired cooling rate in order to achieve desired properties of strength and toughness. In the past the operator has relied upon preset parameters to achieve the proper travel speed of the torch. This is true with the ordinary in field welding machine as well as the more sophisticated gas metal arc welding machine wherein the torch is mechanically moved by the machine according to a travel speed set by the operator. Such a welding machine also includes adjustments for voltage and/or amperage to the torch. It is usually this kind of system where the rate of cooling of the weld bead becomes important because of their use in production lines where specific mechanical properties are desirable. If the operator could be provided with an indication of the rate of cooling of the weld bead he could then adjust the welding machine to provide an optimized weld.

SUMMARY OF THE INVENTION

A system has been provided for indicating the weld metal cooling rate to an operator so that a welding machine can be adjusted to establish a proper travel speed of the welding torch. In this manner the weld will achieve an optimum strength and toughness. The weld metal cooling rate indication system includes a device for continuously sensing a profile of temperature along the weld bead wherein the profile includes a predetermined weld temperature. A device utilizes the temperature profile information as well as travel speed of the torch information from the welding machine to calculate and produce a signal which represents a rate of change of weld temperature at the predetermined weld temperature. Signals which are representative of a range of acceptable rates of change of weld temperatures at the predetermined weld temperature are provided so that a device can utilize this range information with the rate of change of weld temperature at the predetermined weld temperature to compare these two parameters. A device is then utilized to receive the information from the comparing device for indicating whether the rate of change of weld temperature is within, above, or below the range of acceptable rates of change of weld temperatures. If the indicator shows that the rate of change of weld temperature is above the acceptable amount the operator can then adjust the welding machine to decrease the travel speed. If the rate of change of weld temperature is below the acceptable range then the operator can increase the travel speed of the torch to bring the temperature within the acceptable range.

OBJECTS OF THE INVENTION

An object of the invention is to provide an apparatus and method for obtaining a desired cooling rate of a weld bead.

Another object is to provide a system which will indicate weld metal cooling rate so that a welding machine can be controlled to produce a weld bead with optimized strength and toughness.

A further object is to provide a system which will indicate to a welder whether the cooling rate of the welding bead is within, above, or below a desired cooling rate to achieve strength and toughness of the weld bead.

Still another object is to accomplish the latter mentioned object by presenting the cooling rate information to the welder within his helmet outside his direct vision looking toward the weld bead.

Other objects, advantages and novel features of the invention will become apparent from the following detailed description of the invention when considered in conjunction with the accompanying drawings.

BRIEF DESCRIPTION OF THE DRAWING

FIG. 1 is a schematic illustration and circuit diagram of the present invention.

FIG. 2 is an exemplary curve showing temperature vs. distance.

DESCRIPTION OF THE PREFERRED EMBODIMENT

Referring now to the drawing, there is illustrated in FIG. 1 a weld metal cooling rate indication system 10 for a welding machine 12 wherein the welding machine 12 includes a torch 14 which is capable of producing a weld bead 16 for joining two pieces of metal 18 and 20. The welding machine 12 may be of the gas metal arc welding type wherein the welding torch 14 includes a welding rod 21 which is automatically fed by the welding machine through a tubular holder, the tubular holder also being governed in its travel speed by the welding machine by an electrical link 22. The welding machine 12 has adjustment knobs 23 and 24 for adjusting the voltage and amperage to the welding rod and an adjustment knob 26 for adjusting via electrical link 22 the travel speed of the welding torch 14. The travel speed of the welding torch 14 is sensed by the welding machine and a travel speed output signal is utilized for a purpose to be explained hereinafter. The operator of the welding machine may use a welding helmet 28 with a semi-opaque eye piece 30 for viewing the welding torch 14 and the weld bead 16.

Means are provided for continuously sensing a profile of temperature along the weld bead 16 wherein the profile includes a predetermined weld temperature, such as 1,000° F. An exemplary means for accomplishing this purpose is an infrared (IR) sensor 32 which responds to and is controlled by an infrared (IR) scanning system 34. A commercially available IR sensor 32 and scanning system 34 is the AGA Thermal Vision 680. The IR sensor 32 may be fixedly mounted to the welding torch 14 by a mechanical link 33 so that when the welding torch 14 is moved by the welding machine the IR sensor follows therealong. Positioning of the IR sensor is such that it has a field of view including the welding rod 21 at the torch 14 and about five to six inches of the weld bead 16 behind the torch. The IR sensor 32 scans a number of lines, one of which is the closest to coinciding with the centerline of the weld bead 16. The scanlines will give a temperature vs. distance indication, the scanline down the centerline of the weld bead 16 having the steepest slope of all of these lines, which curve is illustrated in FIG. 2. The slope of the line at some predetermined weld temperature, such as 1,000° F., is shown by a tangent line to the curve at 1,000° F. This line represents the rate of change of temperature vs. distance at 1,000° F. The temperature profile curve illustrated in FIG. 2 as well as all of the other temperature profiles for the scanlines of the IR sensor are fed from the IR scanning system 34 to an analog-to-digital (A/D) converter 36. The output of the A/D converter are temperature scans in digital form which are fed to a weld bead temperature profile discriminator 38. This discriminator finds the temperature scan which has the steepest slope, which scan will substantially correspond to the temperature down the centerline of the weld bead 16. The discriminator 38 will then provide a weld bead temperature profile which is exemplified by the curve shown in FIG. 2.

As stated hereinabove the welding machine 12 has a travel speed output. This travel speed output is fed to an analog-to-digital (A/D) converter 40 which has a digital output representing travel speed. Means are provided which are responsive to the temperature profile sensing means and the speed sensor of the welding machine for calculating and producing a signal which represents rate of change of weld temperature at the predetermined weld temperature along the weld bead. An exemplary means for accomplishing these purposes is a calculator 42 which is shown receiving a weld bead temperature profile signal from the discriminator 38 and a travel speed signal from the A/D converter 40. The weld bead temperature profile is temperature vs. distance at 1,000° F. and the travel speed is distance vs. time. When these two inputs are multiplied in the calculator 42 the output is rate of change of the weld temperature at the 1,000° F. level.

Means are provided for producing signals which are representative of a range of acceptable rates of change of weld temperatures at the predetermined weld temperature, namely 1,000° F. An example of such means is a memory storage device 44 which stores the acceptable range of rates of change of weld temperatures at 1,000° F. The 1,000° F. level has been chosen since the welding art has traditionally used this level as a basis for many tests and data collections. Another temperature level could be used as the predetermined temperature level, in which instance the range of acceptable rates of change of weld temperature at that level would shift up or down depending upon whether the predetermined temperature was higher or lower than 1,000° F.

Means are provided which are responsive to the calculating means 42 and the producing means, such as the storage device 44, for comparing the rate of change of temperature signal from the calculator 42 with the range of acceptable rates of change of weld temperature signals from the memory storage 44 and producing signals which represent whether the rate of change of temperature is within, above, or below the range. An exemplary means for accomplishing these purposes is a comparator 46 which may output one of three signals: (1) a signal indicating that the rate of change signal from the calculator 42 is within the acceptable range; or (2) a signal indicating that the rate of change signal from the calculator 42 is above the range; or (3) a signal indicating that the rate of change signal from the calculator is below the range. Obviously, any of these signals could be a no signal type of indication.

The functions of the discriminator 38, the calculator 42, the storage device 44 and the comparator 46 may be accomplished by a computer 47. A suitable computer is the DEC PDP 11/34. A program implementing the present invention on the DEC computer is shown in Table I which is appended to this specification.

Means are provided which are responsive to the comparator 46 for indicating whether the rate of change of weld temperature is within, above, or below the range of acceptable rates of change of weld temperatures. An exemplary indicating means may be an indicator panel 48 which is mounted inside the operator's helmet 28 just above the viewing plate 30 of the helmet so as to be within the peripheral vision of the operator when the operator is wearing the helmet. This panel 48 receives the within, above, or below signals from the comparator 46 and may be adapted with three lights, each light being adapted to receive a respective signal from the comparator. The middle light may indicate that the rate of change of temperature is within the acceptable range, the right light may indicate that the rate of change of temperature is above the acceptable range, and the left light may indicate that the rate of change of temperature is below the acceptable range. Accordingly, if the welder sees the middle light he knows that the welding machine is laying the weld bead 16 down with proper voltage, amperage, and travel speed to achieve the desired cooling rate. If the right light is seen by the operator he knows that the rate of change of temperature of the welding bead is too high, at which time he can decrease the travel speed of the welding machine so that the welding torch 14 will move slower in its laying of the bead. If the welding operator sees the left light of the panel 48 he knows that the rate of change of temperature of the welding bead is too low, at which time the operator can increase the travel speed of the welding machine so that the welding bead will be laid down at a faster rate. Alternatively the welding operator could adjust the volts and amps of the welding machine instead of changing the travel speed. Also, the middle light could be eliminated since the operator needs to make an adjustment only when the right or left light turns on.

It should be understood that the signals from the comparator 46 could be fed directly to the welding machine 12 for directly controlling the travel speed of the welding torch 14. Such an arrangement would eliminate the need of an operator and the helmet 28. Actual change of travel speed may be accomplished with an amplifier (not shown) which receives the signals from the comparator and which then feeds the amplified signal to a servo (not shown) for turning the travel speed handle 26. Alternatively, or in any desired combination the servo could also turn the voltage and amperage knobs 23 and 24.

It should also be understood that the means for continuously sensing a profile of temperatures along the weld bead could be an arrangement other than the IR sensor and scanning system 32 and 34. A substitute system would be a series of IR spot scanners which are fixedly mounted to the welding torch 14 and which are positioned to obtain discrete temperatures along the weld bead 16. These temperatures will provide a temperature profile which will include the predetermined weld temperature, such as 1,000° F. These signals may be converted by the A/D converter 36. With this arrangement the weld bead temperature profile discriminator 38 could be eliminated since the spot scanners have been directed down the centerline of the weld bead 16 and their outputs will indicate the weld bead temperature profile information which is required by the calculator 42.

A method of the invention for indicating weld metal cooling rate for a welding machine 12 wherein the welding machine includes the torch 14 and is capable of producing a weld bead 16 and has a speed sensor which senses the speed of the torch includes the steps of continuously sensing a profile of temperatures along the weld bead, the profile including a predetermined weld temperature, such as 1,000° F. (components 32, 34, 36, and 38); utilizing the temperature profile and travel speed of the welding torch information for calculating and producing a signal which represents rate of change of weld temperature at the predetermined weld temperature along the weld bead (component 42); producing signals which are representative of a range of acceptable rates of change of weld temperatures at the predetermined weld temperature (component 44); comparing the rate of change of temperature signal with the range of acceptable rates of change of weld temperature signals (component 46); and receiving compared information to indicate whether the rate of change of weld temperature is within, above, or below the range of acceptable rates of change of weld temperatures (component 48).

Obviously many modifications and variations of the present invention are possible in the light of the above teachings. It is therefore to be understood that within the scope of the appended claims the invention may be practiced otherwise than as specifically described.

What is claimed is:

1. A weld metal cooling rate indication system for a welding machine wherein the welding machine has a torch which is capable of producing a weld bead and has a speed sensor which senses the speed at which the torch travels as selected by an operator, the indication system comprising:

measns for continuously sensing a temperature versus distance profile curve along the weld bead, said profile curve including a predetermined weld temperature;

means responsive to the temperature versus distance profile curve sensing means and the speed sensor for calculating and producing a signal which represents rate of change of weld temperature at said predetermined weld temperature along the weld bead;

means for producing signals which are representative of a range of acceptable rates of change of weld temperatures at said predetermined weld temperature;

means responsive to the calculating means and the producing means for comparing the rate of change of temperature signal with a range of acceptable rates of change of weld temperature signals and producing signals which represent whether the rate of change of temperature is within, above, or below the said range; and means responsive to the comparing means for indicating whether the rate of change of weld temperature is within, above, or below the range of acceptable rates of change of weld temperatures.

2. An indication system as claimed in claim 1 wherein:

the profile curve sensing means includes an infrared scanner.

3. An indication system as claimed in claim 1 including:

the profile curve sensing means being mounted to the welding torch.

4. An indication system as claimed in claim 3 wherein:

the profile curve sensing means includes an infrared scanner.

5. An indication system as claimed in claim 1 including:

a helmet for the operator; and the indicating means being mounted on the helmet within a view of visiion by the operator when the operator is wearing the helmet.

6. An indication system as claimed in claim 5 wherein:

the profile curve sensing means includes an infrared scanner.

7. An indication system as claimed in claim 6 including:

the profile curve sensing means being mounted to the welding torch.

8. A method of indicating whether a weld metal cooling rate for a welding machine is within an acceptable range wherein the welding machine has a torch which is capable of producing a weld bead and has a speed sensor which senses the speed at which the torch travels as selected by an operator, the method comprising the steps of:

continuously sensing a temperature versus distance profile curve along the weld bead, said profile curve including a predetermined weld temperature;

utilizing the temperature versus distance profile curve and travel speed of the torch information for calculating and producing a signal which represents a rate of change of weld temperature at the predetermined weld temperature along the weld bead;

producing signals which are representative of a range of acceptable rates of change of weld temperatures at the predetermined weld temperature;

comparing the rate of change of temperature signal with the range of acceptable rates of change of weld temperature signals; and utilizing the comparative information for indicating whether the rate of change of weld temperature is within, above or below the range of acceptable rates of change of weld temperatures.

* * * * *